(12) United States Patent
Balogh (10) Patent No.: US 9,658,651 B2
(45) Date of Patent: May 23, 2017

(54) EXPANDING CAPABILITIES OF MOBILE COMPUTING DEVICES

(71) Applicant: MSC ACCESSORIES CORP, Aventura, FL (US)

(72) Inventor: Akos Balogh, Torokbalint (HU)

(73) Assignee: MSC ACCESORIES CORP., Aventura, FL (US)

(*) Notice: Subject to any disclaimer, the term of this patent is extended or adjusted under 35 U.S.C. 154(b) by 18 days.

(21) Appl. No.: 14/670,082

(22) Filed: Mar. 26, 2015

(65) Prior Publication Data
US 2016/0286014 A1 Sep. 29, 2016

(51) Int. Cl.
| H04M 1/00 | (2006.01) |
| G06F 1/16 | (2006.01) |
| G06F 3/01 | (2006.01) |
| H04M 1/18 | (2006.01) |
| H04M 1/725 | (2006.01) |

(52) U.S. Cl.
CPC ............ *G06F 1/1656* (2013.01); *G06F 3/015* (2013.01); *H04M 1/185* (2013.01); *H04M 1/72527* (2013.01); *H04M 2250/12* (2013.01)

(58) Field of Classification Search
None
See application file for complete search history.

(56) References Cited

U.S. PATENT DOCUMENTS

| 4,882,492 A | 11/1989 | Schlager |
| 5,050,612 A | 9/1991 | Matsumura |
| 6,443,906 B1 | 9/2002 | Ting et al. |

(Continued)

FOREIGN PATENT DOCUMENTS

| CN | 201422126 | 3/2010 |
| CN | 202949476 | 5/2013 |

(Continued)

OTHER PUBLICATIONS

Kyle Vanhemert; "Three Big Ideas in Google's Modular Phone That No One's Talking About;" Apr. 22, 2014; http://www.wired.com/2014/04/google-ara-new-deal/.

(Continued)

*Primary Examiner* — Ankur Jain
(74) *Attorney, Agent, or Firm* — Fleit Gibbons Gutman Bongini & Bianco PL; Paul D. Bianco; Gary S. Winer (57) ABSTRACT

A rim for protecting a handheld computing device, such as a smartphone, has left, right, top, and bottom edges sized to engage the corresponding edges of the handheld device. An electronic processor is disposed within at least one of the rim edges, and is able to communicatively connect to the handheld computing device when the handheld computing device is engaged by the rim. The rim resiliently stretches over the handheld device to engage the device, the resilient material further operative to protect the device from damage due to dropping. Sensors are communicatively coupled to the electronic processor, the sensors operable to detect a health parameter of the body of the user when the user grasps the rim engaged with the handheld computing device, and uses the handheld computing device in a normal manner. Electronic backplates having differing features can be attached to the rim and communicate with the rim.

14 Claims, 8 Drawing Sheets

(56) References Cited

U.S. PATENT DOCUMENTS

| | | |
|---|---|---|
| 6,480,724 B1 | 11/2002 | Erkkila et al. |
| 6,511,436 B1 | 1/2003 | Asmar |
| 7,079,864 B2 | 7/2006 | Engstrom et al. |
| 7,350,011 B2 | 3/2008 | Keely et al. |
| 7,413,545 B2 | 8/2008 | Muramatsu |
| 7,593,723 B2 | 9/2009 | Zarom |
| 7,688,580 B2 | 3/2010 | Richardson et al. |
| 8,077,453 B2 | 12/2011 | Swan et al. |
| 8,292,493 B2 | 10/2012 | Mooring |
| 8,395,496 B2 | 3/2013 | Joshi et al. |
| 8,412,289 B1 | 4/2013 | Oh |
| 8,483,758 B2 | 7/2013 | Huang |
| 8,509,848 B1 | 8/2013 | Cole |
| 8,509,863 B2 | 8/2013 | Vedurmudi et al. |
| 8,531,280 B2 | 9/2013 | Golden |
| 8,634,873 B2 | 1/2014 | Jones et al. |
| 8,676,281 B1 | 3/2014 | Caulder et al. |
| 8,763,802 B2 | 7/2014 | Ellis-Brown |
| 8,795,185 B2 | 8/2014 | Cho |
| 8,838,037 B2 | 9/2014 | Niederberger et al. |
| 2002/0147035 A1 | 10/2002 | Su |
| 2003/0036685 A1 | 2/2003 | Goodman |
| 2003/0191399 A1 | 10/2003 | Muramatsu et al. |
| 2007/0010021 A1 | 1/2007 | Kamlowski et al. |
| 2007/0100243 A1 | 5/2007 | Lam |
| 2008/0123287 A1 | 5/2008 | Rossell et al. |
| 2009/0073650 A1 | 3/2009 | Huang et al. |
| 2010/0064883 A1 | 3/2010 | Gynes |
| 2010/0130876 A1 | 5/2010 | Cho |
| 2012/0270600 A1 | 10/2012 | Zelson |
| 2013/0069499 A1* | 3/2013 | Modrell ............... G06F 1/1656 312/223.1 |
| 2013/0203473 A1 | 8/2013 | Kota |
| 2013/0260784 A1 | 10/2013 | Lutz |
| 2014/0034531 A1 | 2/2014 | Wang |
| 2014/0087788 A1 | 3/2014 | Filipovic et al. |
| 2014/0106676 A1 | 4/2014 | Yarger et al. |
| 2014/0141838 A1 | 5/2014 | Cai et al. |
| 2014/0199950 A1 | 7/2014 | Ash, Jr. et al. |
| 2014/0200054 A1* | 7/2014 | Fraden ............... H04M 1/0254 455/575.8 |
| 2014/0228074 A1 | 8/2014 | Kulkarni et al. |
| 2014/0262848 A1 | 9/2014 | Fathollahi et al. |
| 2014/0343377 A1 | 11/2014 | Cho |

FOREIGN PATENT DOCUMENTS

| | | |
|---|---|---|
| DE | 102004001931 | 8/2005 |
| DE | 102005004143 | 8/2006 |
| EP | 0041696 | 12/1981 |
| EP | 2191771 | 6/2010 |
| JP | 2003290226 | 10/2003 |
| WO | 01/65810 | 9/2001 |
| WO | 02/30277 | 4/2002 |
| WO | 2013001265 | 1/2013 |

OTHER PUBLICATIONS

Michelle Starr; "Blocks: A customisable, modular smartwatch;" Oct. 19, 2014 http://www.cnet.com/news/blocks-a-customisable-modular-smartwatch/.

International Preliminary Report on Patentability dated Mar. 13, 2014 for PCT/GB2012/000549.

International Search Report dated Aug. 26, 2013 for PCT/GB2012/000549.

Written Opinion of the International Searching Authority dated Aug. 28, 2013 for PCT/GB2012/000549.

International Search Report dated Jul. 18, 2016 for PCT/US2016/024409.

Written Opinion of the International Searching Authority dated Jul. 18, 2016 for PCT/US2016/024409.

* cited by examiner

EXPANDING CAPABILITIES OF MOBILE COMPUTING DEVICES

FIELD OF THE DISCLOSURE

The disclosure relates to a system and method for protecting mobile computing devices from damage while extending technical features of the computing devices during use, and more particularly, to a resilient bumper or rim including electronic sensors.

BACKGROUND OF THE DISCLOSURE

A modular cellphone or 'smartwatch' called Phonebloks can be modified by replacing wristband links or cellphone components with electronic modules each having different functionality, including microphone; motion sensor; gesture control; GPS; heart monitor; blood oxygen monitor; environment sensor; fingerprint scanner; audio jack; camera; extra battery; concealed USB stick; NFC chip for contactless payments; flashlight; programmable button; SIM port; and kinetic charging. A similar or related design concept sponsored by Google is called Project Ara.

Cellphone cases can include sensors for measuring body parameters, including for example, the cases shown in U.S. Patent Publications 2014/0200054 for vital signs, and 2014/0106676 for glucose monitoring.

Cellphone cases, can provide other attachments, including for example the cases shown in U.S. Pat. No. 8,838,037 for humidity sensing, and U.S. Patent Publication 2014/0141838 for an exchangeable display.

SUMMARY OF THE DISCLOSURE

In an embodiment of the disclosure, a rim for protecting a handheld computing device comprises a left edge sized and dimensioned to engage a left edge of the handheld computing device; a right edge sized and dimensioned to engage a right edge of the handheld computing device; a top edge sized and dimensioned to engage a top edge of the handheld computing device; a bottom edge sized and dimensioned to engage a bottom edge of the handheld computing device; an electronic processor disposed within at least one of the left, right, top, and bottom edges, the processor communicatively connectable to the handheld computing device when the handheld computing device is engaged by the rim; the left, right, top, and bottom edges including a resilient material.

In variations thereof, the rim includes an aperture between the left, right, top, and bottom edges that is sized to reveal all of a display of the handheld computing device when the handheld computing device is engaged within the rim; at least one of the left, right, top, and bottom edges includes a first connector for connecting to the handheld computing device, and wherein at least one of the left, right, top, and bottom edges includes a second connector for electrically connecting to a power supply and communication connector provided for the handheld computing device; the first and second connector are connected to the same one of the left, right, top, and bottom edges; the rim further includes an electronic sensor for detecting a parameter of an environment of the rim; the electronic sensor is connected to the electronic processor; the parameter of the environment is a body temperature of a user of the rim when the rim is engaged with the handheld computing device; the parameter of the environment is an electrical property of the skin of a hand of a user of the rim when the rim is engaged with the handheld computing device; and/or the parameter of the environment is an electrical property of the heart of a user of the rim when the rim is engaged with the handheld computing device.

In further variations thereof, the parameter of the environment is the pulse of a user of the rim when the rim is engaged with the handheld computing device; the electronic sensor automatically detects the parameter when the user grasps the rim; the electronic sensor automatically detects the parameter when the user grasps the rim; the rim further includes one or more electronic sensors for automatically detecting the body temperature and pulse of a user of the rim when the rim is engaged with the handheld computing device and the user grasps the engaged rim to use the handheld computing device; the rim further includes one or more LEDs for measuring the parameter of the environment.

In another variation thereof, the rim further includes a backplate positionable between the left, right, top, and bottom edges of the rim and behind the handheld computing device when the handheld computing device is engaged by the rim, the backplate including an electric connector, and the rim including an electric connector mateable with the electric connector of the backplate to enable communication between the backplate and the rim.

In a variation thereof, the electronic processor is configured to execute software stored on non-transitory media, the software configured to communicate with the backplate and determine if the backplate is authenticated for use with the rim.

In another variation thereof, the rim does not include a front or back portion which would substantially cover the front or back of a handheld device when the handheld device is engaged by the rim.

In another embodiment of the disclosure, a rim for protecting a handheld computing device comprises a left edge sized and dimensioned to engage a left edge of the handheld computing device; a right edge sized and dimensioned to engage a right edge of the handheld computing device; a top edge sized and dimensioned to engage a top edge of the handheld computing device; a bottom edge sized and dimensioned to engage a bottom edge of the handheld computing device; an electronic processor disposed within at least one of the left, right, top, and bottom edges, the processor communicatively connectable to the handheld computing device when the handheld computing device is engaged by the rim; the left, right, top, and bottom edges including a resilient material; and at least one sensor communicatively coupled to the electronic processor, each of the at least one sensor operable to detect a health parameter of the body of the user when the user grasps the rim engaged with the handheld computing device and uses the handheld computing device.

In a variation thereof, the health parameter is at least one of pulse, body temperature, breath rate, oxygen saturation, body fat index, bio-resonance, and ECG information.

In a further embodiment of the disclosure, a method for protecting a handheld computing device comprises engaging a handheld computing device with a rim including resilient material, the rim having a left edge sized and dimensioned to engage a left edge of the handheld computing device; a right edge sized and dimensioned to engage a right edge of the handheld computing device; a top edge sized and dimensioned to engage a top edge of the handheld computing device; a bottom edge sized and dimensioned to engage a bottom edge of the handheld computing device; an electronic processor disposed within at least one of the left, right, top, and bottom edges, the processor communicatively connectable to the handheld computing device when the handheld computing device is engaged by the rim; using at least one sensor communicatively coupled to the electronic processor to detect a health parameter of a body of a user of the rim and handheld computing device by grasping the rim engaged with the handheld computing device and using the handheld computing device.

In a variation thereof, the method further includes attaching a backplate positionable between the left, right, top, and bottom edges of the rim and behind the handheld computing device when the handheld computing device is engaged by the rim, the backplate including an electric connector, and the rim including an electric connector mateable with the electric connector of the backplate to enable communication between the backplate and the rim.

In a further variation thereof, the method further includes stretching the rim in order to insert the handheld computing device within a channel in the rim.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The disclosure provides an intelligent electric modular case system 100 for a smartphone or other handheld electronic computing device 10. System 100 includes an electric bumper or rim 200 that can be protective to the contained device, and optionally an electronic backplate 300 connectable to rim 200. The backplates 300 can be provided with any of a variety of features, each backplate 300 connectable to rim 200. Backplates 300 can in some embodiments be changed 'on the fly', or without turning off device 10. Backplates 300 can electrically connect to rim 200, and rim 200 can relay or transmit this connection to the device 10. Thus, each backplate 300, and the rim 200 in some embodiments, are modules of system 100 that are interchangeable to alter the functionality and uses of device 10.

Figures 1, 1A, 1B, 2, 3:
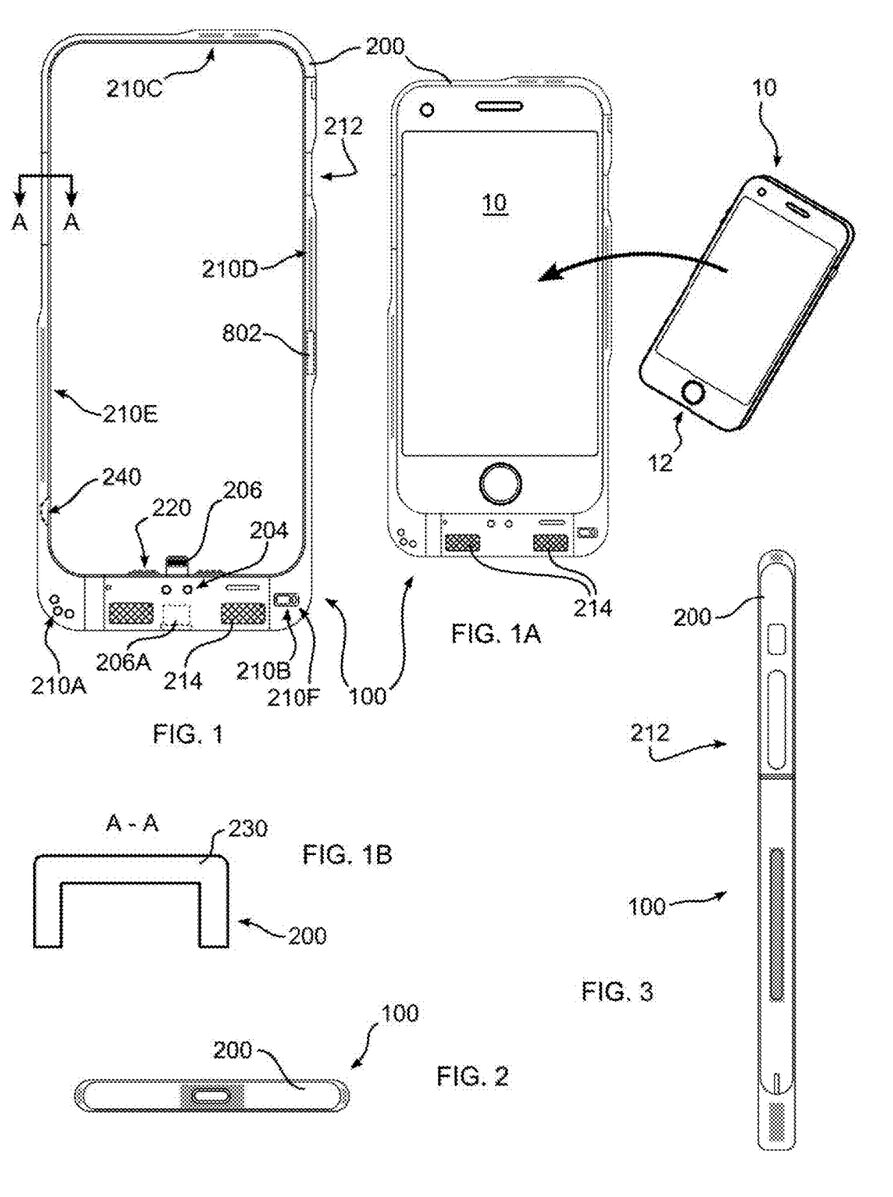
FIG. 1 depicts a rim of the disclosure.
FIG. 1A depicts a prior art device being inserted within the rim of FIG. 1.
FIG. 1B depicts a cross-section of the rim of FIG. 1 taken along line A-A.
FIG. 2 depicts a bottom view of the rim of FIG. 1.
FIG. 3 depicts a left side view of the rim of FIG. 1.

With reference to FIGS. 1-3, rim 200 can provide functionality without a requirement of adding a backplate 300. While backplates are discussed elsewhere herein, it should be understood that rim 200 can independently provide additional functionality for device 10 without the use of a backplate 300, while also providing mechanical protection for device 10. In the embodiment of FIGS. 1-3, no backplate is shown. In an embodiment, a backplate 300 is provided having no functionality other than additional protection and/or decoration.

As can be seen in FIG. 1A, a device 10 has been inserted into a channel 202 formed by rim 200. Channel 202 is illustrated for a cross-section extending through line A-A in FIG. 1, and can extend about a complete inner periphery of rim 200, or about a sufficient portion of an interior periphery of rim 200 to securely retain rim 200 upon device 10. In a further embodiment, device 10 is secured by elastomeric or gummed members 228 disposed about in interior surface of rim 200, for example in corners thereof. Gummed or grippy members 228 can be combined with channel 230, or can be used without channel 230. In alternative embodiments, rim 200 is adhered to device 10, or is releaseably connected to device 10 by hook and loop fastener portions.

As can be seen in FIG. 1A, device is inserted into rim 200, to be surrounded about all or a substantial portion of device 10. In an embodiment, rim 200 stretches to fit about device 10. In such embodiments, rim 200 can be fabricated using a stretchable or elastomeric material, for example polyurethane, phenolic, polycarbonate, rubber, or vinyl. As can be seen in a cross-section taken along line A-A in FIG. 1, FIG. 1B depicts a channel 230 formed within rim 200, sized and shaped to closely conform or to be slightly smaller than an external peripheral portion of the device 10 that rim 200 is configured to protect. Rim 200 is bent and/or stretched to extend over device 10 until the external peripheral portion is engaged within channel 230 and device 10 is at least partially contained within rim 200. Alternatively, rim 200 can include a latch mechanism, described elsewhere herein.

Rim 200 can be provided with various types of analyzers or sensors 210 for the purpose of taking measurements of vital signs or other biological parameters or data of a user of system 100 together with a handheld computing device. System 100 can be configured to obtain this data automatically as the device is used for other purposes, if desired, or can be configured to collect data only when requested. The data can be communicated to the user using LEDs 204, an LED or LCD display embedded within rim 200, or a display within a backplate 300 of system 100. Alternatively, the data can be sent to the smartphone device via its charger/data port to be analyzed and displayed using a software application executing upon the device 10. An electronic processor or microcontroller 802 disposed within rim 200, device 10, and/or backplate 300 can be connected to software on transitory or non-transitory media, the software configured to collect data from the one or more sensors 210, and can further interpret the data for use by humans or other computers.

It should be understood that a limited number of analyzers or sensors 210 are described herein, and that the total number of possible variations is quite large, and continuously increasing. System 100 can incorporate any known device, analyzer, or sensor 210, and any hereinafter developed.

System 100 can be configured for a wide variety of devices, including cell phones, smart phones, watches, tablets, laptops, or any other hand-holdable or wearable electronic device. For smartphone embodiments, communication between rim 200 and device 10 can be carried out using a standard charging/data port 12 of the device, which can be, for example, a standard micro USB port, or a proprietary port, such as the APPLE LIGHTNING connector of an IPHONE. In such embodiments, rim 200 can include a male adapter portion 206, if a charging data connection cable for device 10 is male, or a female adapter portion if the charging/data connection cable is female. In this manner, power can be relayed, from a connection of a standard power/data cable for the device to a replacement port 206A, though rim 200, to device 10. Rim 200 can be powered by this connection, as well, and can change data passed through the standard power/data cable before it reaches device 10. Rim 200 can include a battery (not shown) for powering rim 200 and/or device 10, or can obtain power from a battery of device 10, for example connector 206. In this manner, rim 200 and backplates 300 can be charged simultaneously with device 10, and do not require separate chargers, or attention to their charging beyond what is required for device 10 alone.

Alternatively, rim 200, and in an embodiment, device 10, can receive power from a backing plate 300 which includes a battery. Rim 200 can communicate with device 10 through connector 206, or alternatively by wireless means, such as WiFi, BLUETOOTH, or any hereinafter developed wireless or wired means. A wireless network can be created that includes any or all of rim 200, device 10, and backplate 300. A further benefit of connecting rim 200 and through rim 200 any of backing plates 300, is that these connected devices can exploit WiFi, BLUETOOTH, or any other wired or wireless connection of device 10, or can alternatively provide such connection to device 10, thereby enabling a single such connection to be made, serving all assembled devices.

Rim 200 can include one or more sensors 210, in various forms within FIG. 1 as 210A-210E. While sensors are illustrated having particular configurations, it should be understood that there are a great many possible configurations for such sensors, and their position, unless otherwise described herein, can be at other locations upon rim 200 than the positions shown. While certain sensors are described for medical related purposes, it should be understood that not all sensors may provide sufficient accuracy or reliability to be safely used in a high risk situation. In these events, sensors 210 can be used as an estimate of a physical condition, and further proper medical help can be obtained.

Sensor 210C depicts a body temperature sensor, and can be used for measuring a body temperature of a user during use of device 10. A location on rim 200 is selected where device 10 is expected to be held against an area of the body commonly used for such measurements, including the temple, forehead, or neck. In the embodiment shown, it is expected that the top of rim 200 will be held near the temple. In accordance with the disclosure, a device 10 can generate heat which can impact a measurement of sensor 210C. Accordingly, calibrations can be made at different operating and ambient temperatures that device 10 is expected to encounter. Calibrations can be made during manufacturing and testing, or regularly during use of device 10. Alternatively, sensors, including sensor 210C, can be of a non-contact type, which gathers data by emitting a beam or signal.

As with all sensors herein, data from sensor 210 can be communicated to an electronic processor 802 incorporated into rim 200, backplate 300, and/or device 10, so that the data can be used. Forms of use can include an analysis, presentation by audio, visual, tactile, or any other means, and storage or transmittal to other systems. In an embodiment, data captured from a sensor 210 is used to control another device, for example a car ignition, a door lock, or a therapeutic drug dispenser. While sensors 210 and other components of system 100 are depicted at the top and bottom of rim 200, it should be understood that such components can be positioned solely along the sides, or any two opposing edges of rim 200, to avoid adding one of length or width to an assembly of device 10 and rim 200.

A breath sensor 210A can be positioned near an area exposed to breath of a user during use of device 10. In an embodiment, breath sensor 210A is a chemical-based sensor capable of receiving data when a person blows air into or towards it. Using this information, software executed by a process is capable of determining a breath alcohol content of the user, and/or an acetate content of the breath of a user. The latter can be an indicator especially useful for diabetic individuals. The breath sensor can be located on the front of rim 200, in the bottom left corner, or at any other location upon rim 200 or a backplate 300.

In a further embodiment, a sensor 210F, located alternatively at 210B or other location upon rim 200 or backplate 300 which is capable of analyzing body liquids within a strip of paper or other material of that is placed into contact with the sensor. For example, the paper strip can be configured to change color based upon an acid content of blood or saliva, and this color can be read by which is then read by The Sampler, and analyzed by the software application. In another embodiment 210F can detect the presence of one or more chemicals, for example an illicit drug or explosive material, that is present upon a sample held proximate to or in contact with sensor 210F.

An optical sensor 210B can be provided for measuring a pulse and oxygen saturation of a user. The optical component can include one or more LEDs, or other known or hereinafter developed method. One convenient location is the front of rim 200 in the bottom right corner, although other locations, including upon a backplate 300, can be used.

One or more impedance sensors 210D, 210E can be used for measuring the body 30 impedance of a user, at predetermined voltages, in order to determine the body-fat index and bioresonance of the user. Sensors 210D, 210E can be located on opposite sides of rim 200, so that 11 each sensor contacts different skin areas of the body, in this case differing areas of the hand. Impedance sensors 210D, 210E can be configured to continuously and automatically collect data from the user as long as they are physically connected with a palm or hand of the user. Based on the collected data, the software application can give information to the user regarding their wellbeing and fitness, without a requirement of any particular steps by the user other than using device 10 as they otherwise would. Rim 200 can further include a sensor, including for example a microphone, operable to measure a breath rate of a user of device 10 when device 10 is contained within rim 200.

Rim 200, as well as backplate 300, can be made using any suitably strong, light, and cost-effective material, including plastic, metal, wood, or any synthetic material. A resilient material is advantageously placed a corners of rim 200, and can extend forwards of a leading face, and rearwards of a back face of device 10, to protect device 10 against drops from any orientation. In particular, rim 200 can be sufficiently resilient to protect device 10 from damage under standardized testing conditions, for example conditions defined or applied to gain CE (Conformité Européenne) certification. For embodiments of rim 200 which must stretch to be positioned over and around device 10, at least portions of rim 200 are fabricated using a stretchable material.

In an embodiment, bumper 200 includes LEDs 204 or other light sources, which can illuminate in varied colors as visual indicators for call, messages, power status, or other notifications, information, or entertainment.

Rim 200 includes openings or flexible areas 212, through which buttons or controls of device 10 can be operating when rim 200 is positioned upon device 10. External speakers 214 or other devices can be provided where rim 200 obscures, covers, or otherwise impacts original features. Alternatively, external speakers 214 and other devices which can be configured within or upon rim 200 can be used to supplement or augment functionality of device 10. An example is providing stereo output where device 10 only includes monophonic output.

Figure 4:
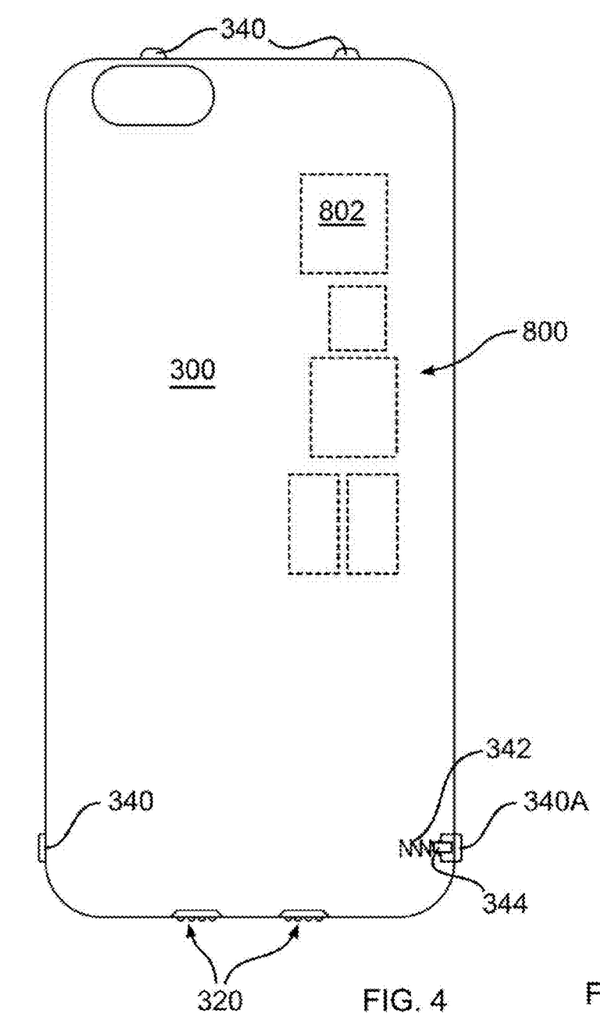
FIG. 4 depicts a front view of a backplate of the disclosure.
Figure 5:
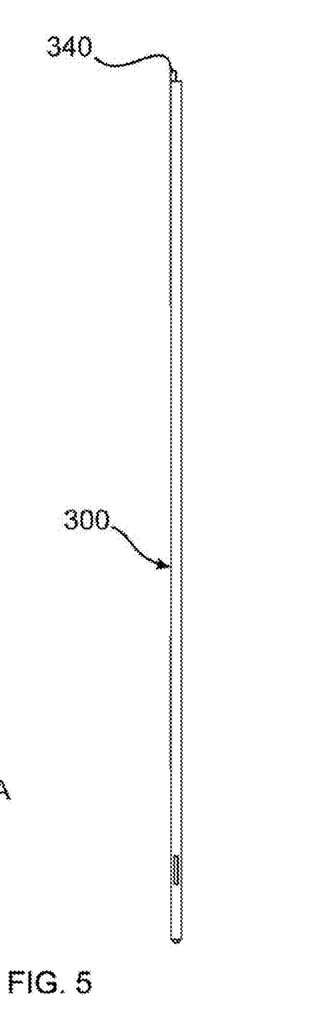
FIG. 5 depicts a left side view of the backplate of FIG. 4.
Figure 6:
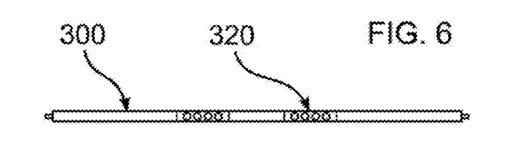
FIG. 6 depicts a bottom view of the backplate of FIG. 4.

With reference to FIGS. 4-6, a backplate 300 can include one or more electric or optical connectors 320 positioned to mateably connect with a connector 220 of rim 200. This connector can provide power and signal/data from the backplate to any or all of an external cable, device 10, and rim 200. In an embodiment, each connector 320 communicates with a different component of system 100, or alternatively, one or more connectors are redundant for reliability. in an embodiment, connector 320 is a 9 pin connector, with 8 pins for data and power, and one pin can function as a safety measure for ensuring that all electrical flow is terminated when backplate 300 is removed. Connector 320 can be any other type and configuration of connection, including an optical connector, or a mix of optical and electrical connections, with a number of conductors or communication ports appropriate for the intended function of backplate 300. Although connector 220 is illustrated at a lower location upon rim 200, it may be positioned anywhere upon rim 200, with a corresponding location upon backplate 300 provided for mating connector portion 320.

A backplate 300 can be an active type by providing additional electronic functionality to device 10. In an embodiment, to maintain security and reliability of device 10, backplates 300 communicate to rim 200 in order to electronically establish authenticity or suitability of backplate 300, or rights of backplate 300 or user of backplate 300 to establish communication between rim 200 and backplate 300. Software can authenticate the backplate based upon information provided by the backplate 300, the software executing upon a processor within rim 200, device 10, a computer within a LAN or within wireless range of backplate 300, or a computer connected by a WAN or the Cloud. In a further embodiment, backplates are physically keyed by blocking tabs 340 or other structures which cooperate with other tabs or slots 240 upon or within rim 200, to ensure backplates 300 are only used with certain other rims 200 or devices 10. Once authorized and granted permission, for backplates requiring authorization, backplate 300 can being to receive power, or to transmit power if backplate 300 is a charger, and to function.

Backplate 300 can be attached to the back of rim 200 using a connection mechanism that can be uniform across all backplate variations, enabling backplates 300 to be 'swapped out', or switched one for the other. Backplates 300 can advantageously be removed without a requirement to turn off or shut down components on backplate 300, although this may not be possible for every type of backplate configuration. With further reference to FIGS. 4-6, tabs 340 are sized and dimensioned to be inserted into mating slots 240 within rim 200. In an embodiment, rim 200 is stretched to admit passage of static tabs 340. In another embodiment, moveable catch 340A is slideable within backplate 300, resiliently urged outwards by a spring 342 or other resilient member. A control tab 344 can be pushed by the user to release catch 340A from engagement within a mating slot 240 within rim 200. One or more of catch 342 can be used in different locations upon backplate 300, or backplate 300 can be mounted entirely using static tabs 340. As illustrated, backplate 300 is designed to be as thin as possible, to minimize increasing the overall size of an assembly of device 10 and system 100.

Figure 7:
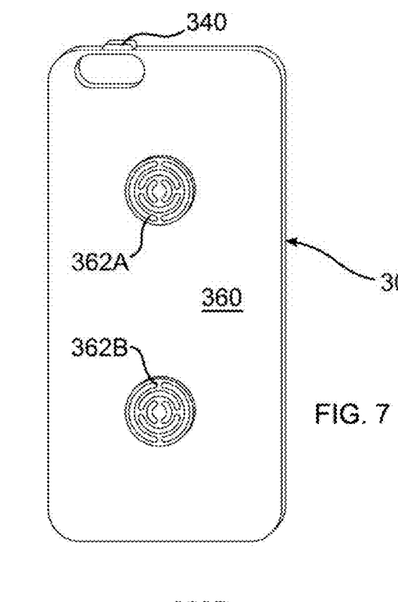
FIG. 7 depicts a front view of an ECG backplate of the disclosure.
Figure 8:
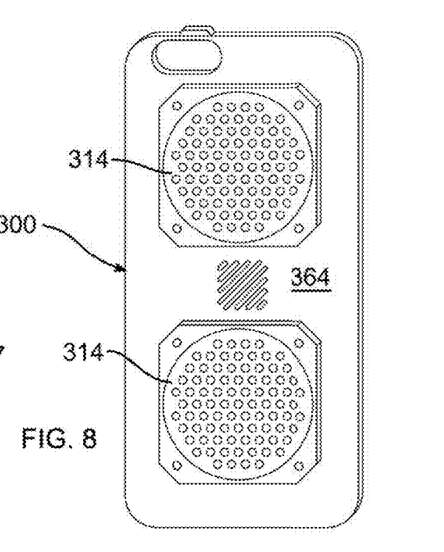
FIG. 8 depicts a front view of a stereo speaker backplate of the disclosure.
Figure 9:
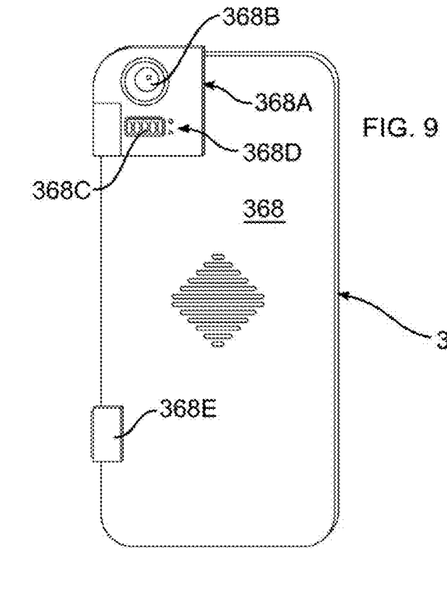
FIG. 9 depicts a front view of a camera backplate of the disclosure.
Figure 10:
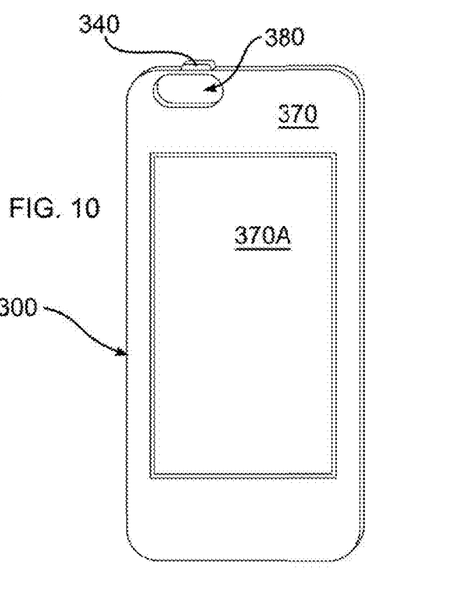
FIG. 10 depicts a front view of a display screen backplate of the disclosure.

Example backplates are shown in FIGS. 7-10, in which FIG. 7 illustrates an electrocardiograph (ECG) 360, including electrodes 362A, 362B which can be placed on the skin upon the chest to measure electrical activity associated with the heart. FIG. 8 illustrates a stereo speaker backplate 364, with speakers 314. An amplifier and/or a battery can be provided within backplate 364, or a connector for an amplifier or power source can be provided upon backplate 364. FIG. 9 illustrates a camera backplate 368 including a camera 368A having an associated lens 368B, flash 368C, sensors 368D, and shutter release button 368E. FIG. 10 illustrates a display screen backplate 370 with a video display 370A. Display 370A can provide a display for a device 10 that does not have a display, or can replace or supplement a display of device 10. It should be understood that the backing plates 300 can be provided which include the functionality of more than one of the various backing plates suggested herein. Further, there are many possibilities for functionality of backplates 300 not suggested herein. Additionally, one or more openings 380 can be formed in backplate 300 to reveal features of device 10 which must be uncovered during use. Such openings 380 can be covered by a flap or covering to protect the associated device feature, or to maintain water tightness.

Figure 11:
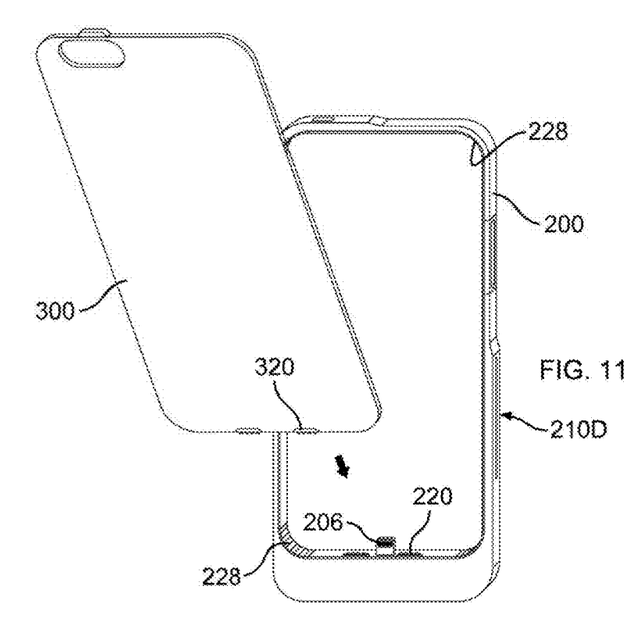
FIG. 11 depicts a backplate of the disclosure being inserted into a rim of the disclosure.
Figure 12:
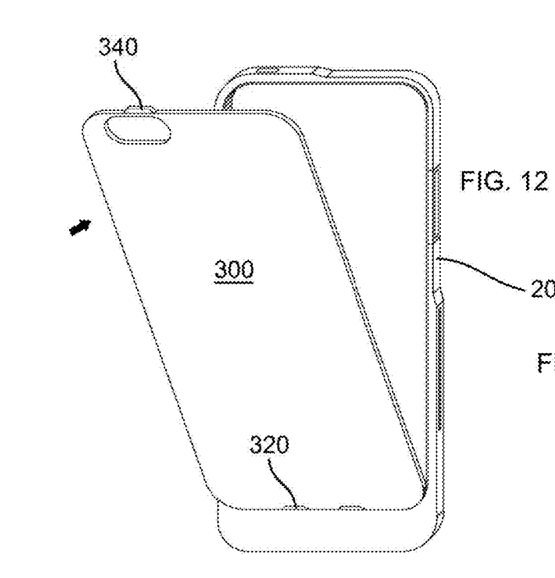
FIG. 12 depicts engagement of a communication connector of the rim and backplate of FIG. 11.
Figure 13:
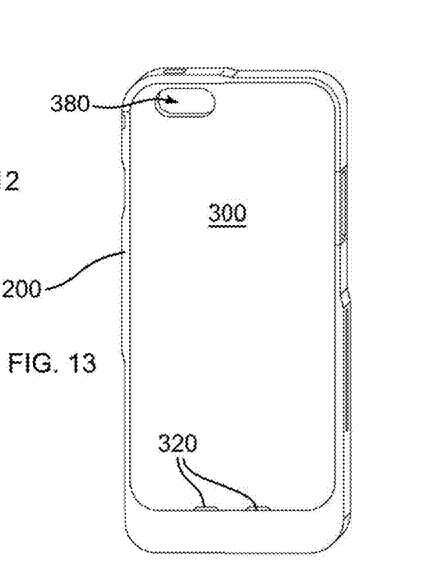
FIG. 13 depicts the assembled rim and backplate of FIG. 11.
Figure 14:
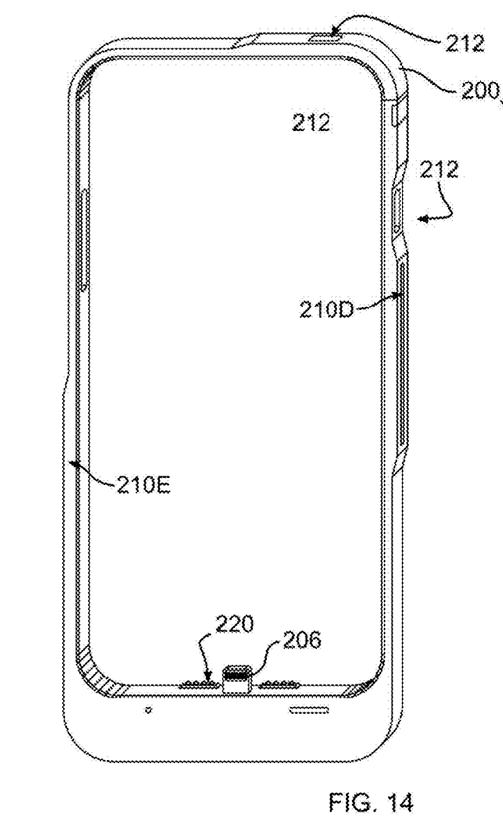
FIG. 14 depicts a perspective view of an alternative rim of the disclosure.
Figure 15:
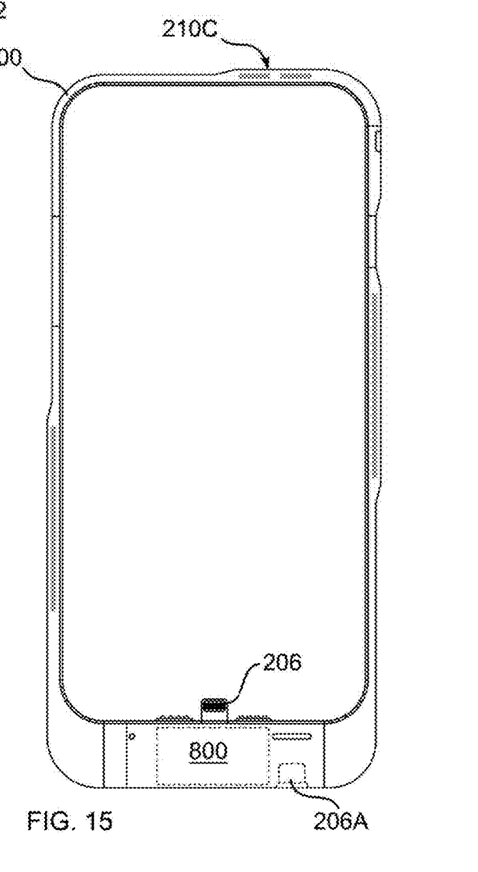
FIG. 15 depicts a front view of the rim of FIG. 14, showing hidden components thereof.

FIGS. 11-13 illustrate a backplate 300 of the disclosure being inserted into a rim 200 of the disclosure. In FIG. 11, a connection is made between connectors 220 and 320, electronically joining rim 200 and backplate 300. The connection between connectors 220 and 320 provides sufficient slack, or the connectors mate in a pivotable way, for example a ball in socket, so that as shown in FIG. 12, backplate 300 can be pivoted about the connection thus formed, to engage one or more of tab 340 with one or more of slots 240, as described elsewhere herein. As can be seen in FIG. 13, backplate 300 and rim 200 are assembled into a unified structure, which can include a watertight seal, wherein backplate 300 is secured upon rim 200 in a data transmitting capacity. Connector 320 is visible in FIG. 13, although it is possible to dispose connector 320 internally within, or upon an inside surface of backplate 300, and thus to prevent visibility of a connection between connectors 320 and 220.

For electronic backplates 300, once backplate 300 is attached to rim 200, a microcontroller 802A within rim 200 can automatically recognize the established electrical or optical connection between backplate 300 and rim 200, and can send request information to software executing within rim 200, or within device 10. For backplates 300 requiring authentication, once the software has determined that a backplate 300 is genuine and correct for attachment to a particular rim 200 and/or device 10, permission can be granted to rim 200 or device 10 to being supplying power to the authenticated backplate 300, and to allow data exchange between rim 200 and/or device 10. In an embodiment, authentication is based on a unique serial number communicated by backplate 300 to rim 200 and/or device 10. This code can be compared using an internal algorithm, or can be compared with an allowed list available from another computer in communication with rim 200 and/or device 10. In an embodiment, a BLUETOOTH or other communication protocol can be used for communication between rim 200 and/or device 10, and one or more backplates 300, before such backplates 300 are connected to rim 200.

Authentication serves as a safety measure, particularly for medical applications, to avoid unauthorized backplates 300 to be used that may not meet advertised and expected standards of performance in cooperation with rim 200. Authentication further helps to ensure attached backplates 300 function exactly as intended, and comply with all applicable health and safety regulations.

In an embodiment, a plurality of backplates can be connected to rim 200, or to each other, in connection with rim 200, using the connection means described herein. Rim 200 can coordinate communication between attached backplates, and/or the attached backplates can form an electrical or optical connection between each other.

With reference to FIGS. 21-25, in addition or in lieu of backplate 300, rim 200 can be configured to accept a connection to one or more modular units 502, 504 connected to rim 200 along a side surface of rim 200. Upper unit, shown in FIG. 21, can communicatively connect to device 10 by a headphone jack or other connector, the camera lens, or can communicate with rim 200, backplate 300, or device 10 wirelessly or by a wired connection, and can physically connect to rim 200 or device 10 by any means described herein. Unit 504 can include a sensor 508, or any other electronic device. Lower unit 502, shown in FIG. 22, can include connectors 206, 206A, as described elsewhere herein, or can connect in the manner described for unit 504, and can include any of the sensors or features positionable upon rim 200 or backplate 300 described herein. Either or both of lower and upper units 502, 504 can be used in lieu of rim 200, or in addition to it. In an embodiment, unit 502 or 504 includes an expensive sensor 506 or 508 that is available on a temporary basis to users who require it. Examples include a genetic testing module, a blood gas analyzer, or a chemical detector. Rim 200 can operate to authenticate the use of unit 502 or 504 that includes sensor 506, to reduce the possibility of theft of unit 502 or 504. Sensor 506 can similarly be provided upon a backplate 300, which can likewise be authenticated for use. In this manner, unit 502, 504, a rim 200, or a backplate that includes sensor 506 can be provided for a limited period of use, and/or for a limited number of uses, for example as an item for rent.

In an embodiment, Rim 200 and backplate 300 can connect with a resilient seal that operates to prevent water intrusion. In a further embodiment, rim 200 and backplate 300 completely encase device 10 in a waterproof or water intrusion resistant covering. For example, rim 200 can include a clear cover which enables visualization of a display of device 10, and can form a watertight seal with an active or inactive backplate 300.

In various embodiments, any or all functions described herein which are provided upon a backplate 300 can be provided by rim 200, with or without an active or inactive backplate 300 present or attached to rim 200. Rim 200 can advantageously be used without a backplate, and can incorporate the functions of one or more backplate portions. Rim 200 can further function without a front, or screen covering portion. As such, rim 200 covers only edge side portions of device 10, and a very small front or back portion as required for operation of channel 230 shown in FIG. 1B, and to provide additional drop or slipping protection. More particularly, the lack of a back portion provides the user with drop protection, enables connection with a backplate 300 when needed, while providing a reduced overall size of system 100, particularly with respect to an overall depth of system 100.

Moreover, components which would otherwise increase the size and cost of most backplate 300 configurations can be avoided within the various backplate 300 devices, eliminating redundancy of these components in the various backplates. Eliminating these redundant components reduces the size and weight of the backplates, so that it is easier to bring more such backplates 300 along with the user, but also reduces the cost of each backplate 300 which can exploit the electronics within rim 200 as opposed to having such components within backplate 300.

Figure 16:
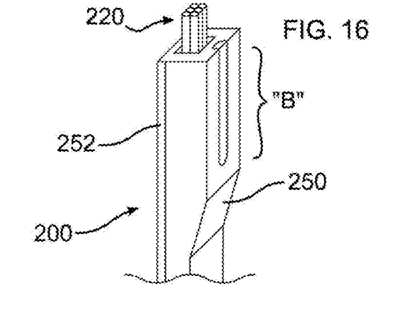
FIG. 16 depicts a horizontal cross section of a side portion of the rim of FIG. 14.
Figure 17:
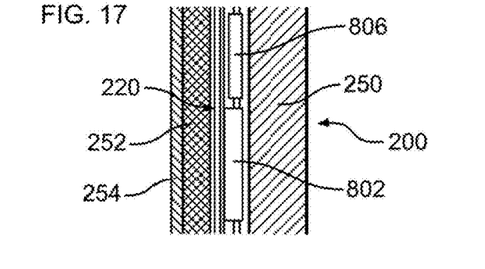
FIG. 17 depicts a vertical cross section of a side portion of the rim of FIG. 14.

With reference to FIGS. 16 and 17, in which FIG. 17 is a cross-section through area "B" of FIG. 16, rim 200 can include current carrying conductors or wires 270 and electronics, including for example one or more microprocessors 802 and associated memory or storage 806, as well as sensors and related electronics as discussed herein. These wires and electronics can convey power and information about the rim to the various sensors, and to an attached backplate 300 or device 10. The cross section of FIG. 17 illustrates one possible configuration of rim 200, in which an outer layer 250 includes hard plastic for wear resistance and durability, possibly including portions of resilient rubber or polymer for a reduction in G forces should an assembly of rim 200 and device 10 be dropped. An inner layer of softer rubber or polymer 252 can further reduce such G forces to protect associated electronics, sensors, and devices. A coating 254 can be provided to facilitate sliding device 10 into rim 200. Alternatively, coating 254 can include metallic elements which reduce radio interference between device 10 and electronic components of rim 200 or backplate 300. One or more of these layers can be omitted where not needed, or to reduce costs.

For rims 200 which include elastomeric or stretchable material, wires embedded within the rim can include slack to enable the wires to elongate to stretch together with the stretchable material when rim 200 is placed upon device 10.

Figure 18:
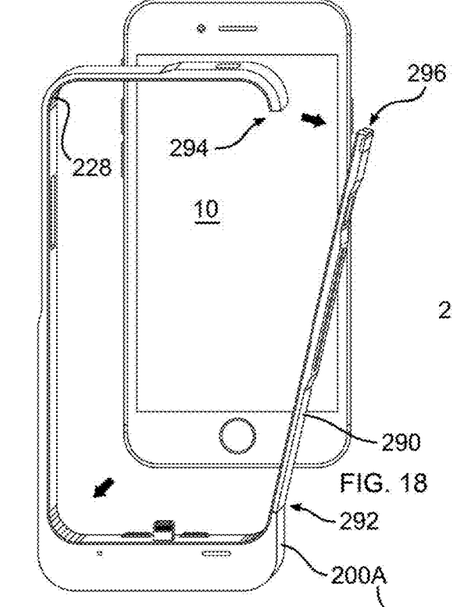
FIG. 18 depicts a perspective view of a further embodiment of a rim in accordance with the disclosure, including a hinged side portion.
Figure 19:
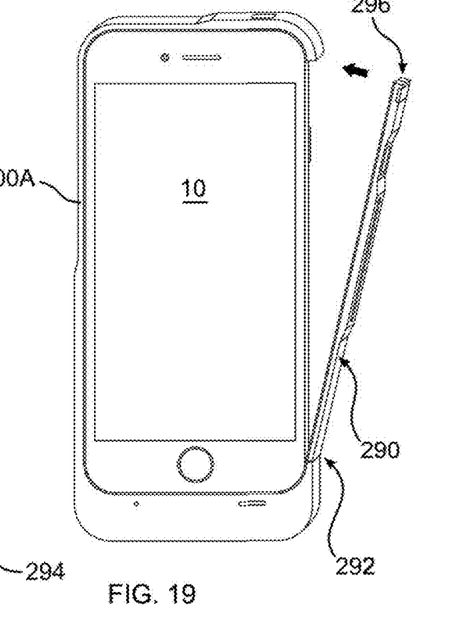
FIG. 19 depicts the rim of FIG. 18 enclosing a prior art device.
Figure 20:
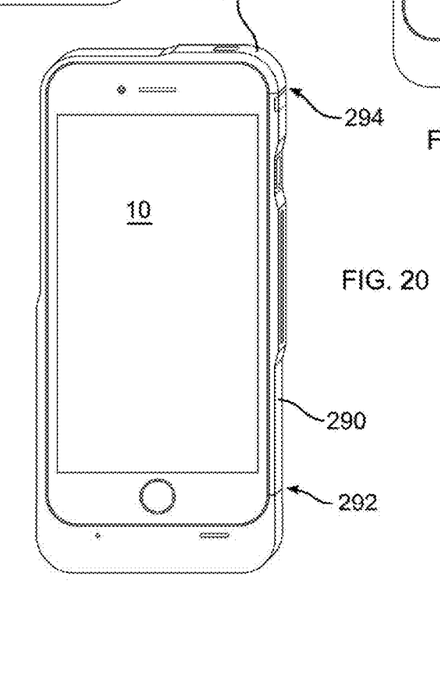
FIG. 20 depicts the rim of FIG. 18, with the hinged side portion closed.
Figure 21:
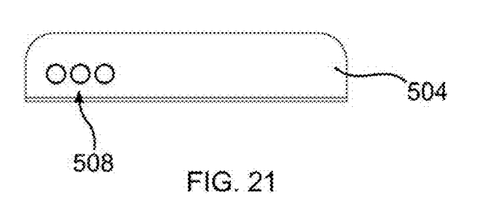
FIG. 21 depicts an upper attachment unit for a rim of the disclosure, or for a prior art device, including one or more sensors or electronic devices.
Figure 22:
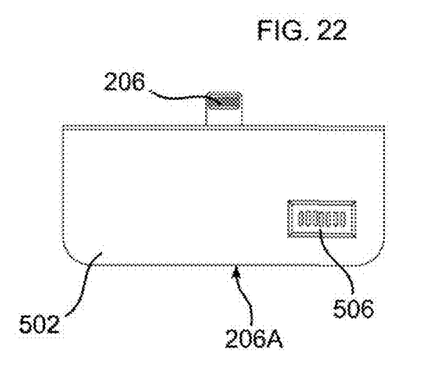
FIG. 22 depicts a lower attachment unit for a rim of the disclosure, or for a prior art device, including one or more sensors or electronic devices.
Figure 23:
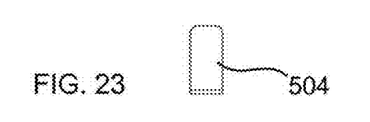
FIG. 23 depicts a side view of the upper attachment unit of FIG. 21.
Figure 24:
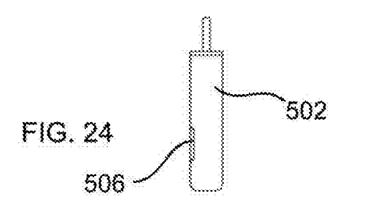
FIG. 24 depicts a side view of the lower attachment unit of FIG. 22.
Figure 25:
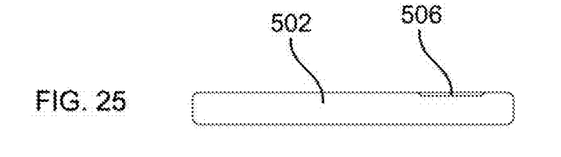
FIG. 25 depicts a bottom view of the lower attachment unit of FIG. 22.

In FIGS. 18-20, an alternative method of connecting rim 200 to device 10 is shown. In this embodiment, a side portion 290 of rim 200 is removable, or pivotably connected at 292 to rim 200. Portion 290 can be connected to a remainder of rim 200 by a living hinge, a hinge having a hinge-pin, a magnet, hook and loop fastener, a post in a socket, or by any other known means. Alternatively, portion 290 can attach and pivot by bending wires which pass from portion 290 to a remainder of rim 200. A latch is formed at 294, and a connection can be formed by any known means, including a magnet, hook and loop fastener, pin or post that is slid into a socket, dovetail connection, or any other known means of releasable connection. While an electrical connection can be formed through pivot 292, thereby enabling a signal to travel entirely around rim 200, an electrical connection can still be formed at latch 294, for example by mating contacts 296 between an end of side portion 290 and a mating end 298 of rim 200. In a variation thereof, mating contacts 296 can be formed upon a post that is slid from portion 290 into a remainder of rim 200, or vice versa. With portion 290 disconnected at latch 294, expansion of rim 200 to permit entry of device 10 is facilitated, particularly where rim 200 includes a non-resilient outer shell. While a hinged vertical side portion is illustrated, it should be understood that a top or bottom side portion can be hinged, or to adjacent side portions can pivot together upon a single hinge.

The disclosure provides various sensors and software to continuously monitor and analyze the health of a user of an assembly of rim 200 and device 10. By incorporating such functionality into rim 200, there is a minimal additional weight or size burden for the user, and rim 200 gathers data while device 10 is otherwise used in a normal manner, both serving to increase patient compliance. Additionally, other functionality can be added in the form of replaceable backplates 300, without losing track of the important function of monitoring the health of the user, which can be continuously carried out by rim 200 as backplates with various functions are added or replaced.

Thus, modular backplates 300 of the disclosure can be categorized as to their function and purpose. There are backplates 300 that further enhance and expand the wellbeing and health tracking functions of rim 200, including ECG backplate 360. There are also backplates that focus on entertainment, such as backplate 364 with extra speakers, and backplate 370 with an extra screen. Additionally, there are backplates to for leisure or work, including camera backplate 368, which can include a higher resolution camera and other features, such as an extra flash module. These are only a few representative examples regarding possible synergies between rim 200 and the various backplates, and how easy it can be, in accordance with the disclosure, for a user to quickly replace backplates 300 and thereby change an ability associated with device 10.

Rim 200 and/or backplate 300 can be provided to communicate with ancillary devices, for example devices which are worn, such as smart watches, smart glasses, or smart clothing. Software can be provided within rim 200 and/or backplate 300 to effectively communicate with such devices, or may be provided for execution by device 10.

In another embodiment of the disclosure, databases can be maintained upon device 10, another computer of the user, or upon a computer connected by a LAN or WAN, which can gather data provided by rim 200 and/or backplate 300. A web browser can provide access to this data in raw form, or presented in an easily understood manner, such as in charts or graphs. Such data can be shared between users by communication between more than one rim 200 or backplate 300, or the data can be shared using a remote connection, such as a LAN or WAN.

Example Computing System

Figure 26:
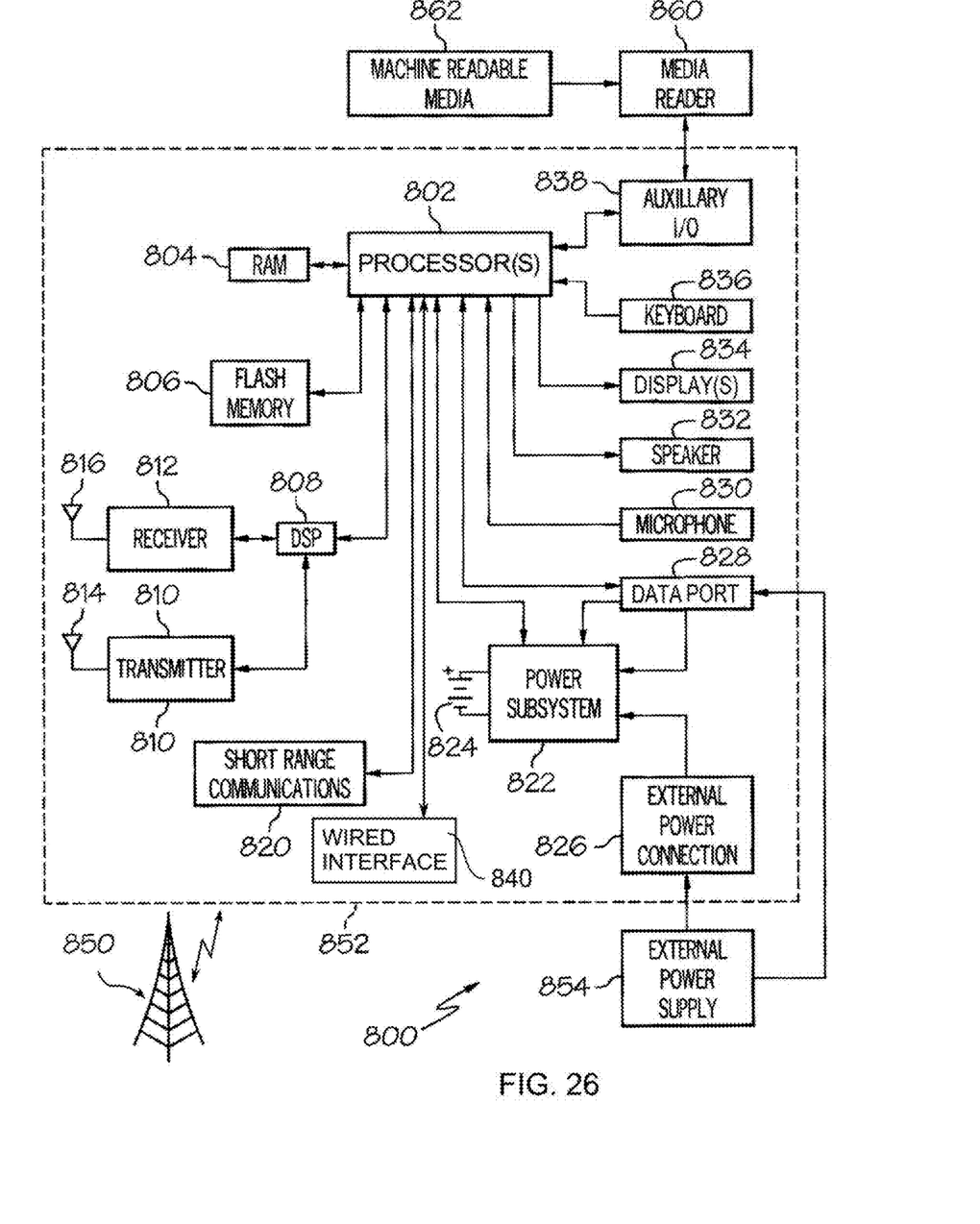
FIG. 26 is a diagrammatic view of a computer and communication system, part or all of which can be incorporated into a rim, backplate, or attachment unit of the disclosure, or which can be found in a prior art device that can be connected to a rim, backplate, or attachment unit of the disclosure.

FIG. 26, is a block diagram of an electronic device and associated components 800, which can be used in carrying out the disclosure. In this example, an electronic device 852 is a wireless two-way communication device with voice and data communication capabilities. Such electronic devices communicate with a wireless voice or data network 850 using a suitable wireless communications protocol. Wireless voice communications are performed using either an analog or digital wireless communication channel. Data communications allow the electronic device 852 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 852 is an example electronic device that includes two-way wireless communications functions. Such electronic devices incorporate communication subsystem elements such as a wireless transmitter 810, a wireless receiver 812, and associated components such as one or more antenna elements 814 and 816. A digital signal processor (DSP) 808 performs processing to extract data from received wireless signals and to generate signals to be transmitted. The particular design of the communication subsystem is dependent upon the communication network and associated wireless communications protocols with which the device is intended to operate.

The electronic device 852 includes a microprocessor 802 that controls the overall operation of the electronic device 852. The microprocessor 802 interacts with the above described communications subsystem elements and also interacts with other device subsystems such as flash memory 806, random access memory (RAM) 804, auxiliary input/output (I/O) device 838, data port 828, display 834, keyboard 836, speaker 832, microphone 830, a short-range communications subsystem 820, a power subsystem 822, and any other device subsystems.

A battery 824 is connected to a power subsystem 822 to provide power to the circuits of the electronic device 852. The power subsystem 822 includes power distribution circuitry for providing power to the electronic device 852 and also contains battery charging circuitry to manage recharging the battery 824. The power subsystem 822 includes a battery monitoring circuit that is operable to provide a status of one or more battery status indicators, such as remaining capacity, temperature, voltage, electrical current consumption, and the like, to various components of the electronic device 852.

The data port 828 of one example is a receptacle connector 104 or a connector that to which an electrical and optical data communications circuit connector 800 engages and mates, as described above. The data port 828 is able to support data communications between the electronic device 852 and other devices through various modes of data communications, such as high speed data transfers over an optical communications circuits or over electrical data communications circuits such as a USB connection incorporated into the data port 828 of some examples. Data port 828 is able to support communications with, for example, an external computer or other device.

Data communication through data port 828 enables a user to set preferences through the external device or through a software application and extends the capabilities of the device by enabling information or software exchange through direct connections between the electronic device 852 and external data sources rather then via a wireless data communication network. In addition to data communication, the data port 828 provides power to the power subsystem 822 to charge the battery 824 or to supply power to the electronic circuits, such as microprocessor 802, of the electronic device 852.

Operating system software used by the microprocessor 802 is stored in flash memory 806. Further examples are able to use a battery backed-up RAM or other non-volatile storage data elements to store operating systems, other executable programs, or both. The operating system software, device application software, or parts thereof, are able to be temporarily loaded into volatile data storage such as RAM 804. Data received via wireless communication signals or through wired communications are also able to be stored to RAM 804.

The microprocessor 802, in addition to its operating system functions, is able to execute software applications on the electronic device 852. A predetermined set of applications that control basic device operations, including at least data and voice communication applications, is able to be installed on the electronic device 852 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 852 through, for example, the wireless network 850, an auxiliary I/O device 838, Data port 828, short-range communications subsystem 820, or any combination of these interfaces. Such applications are then able to be installed by a user in the RAM 804 or a non-volatile store for execution by the microprocessor 802.

In a data communication mode, a received signal such as a text message or web page download is processed by the communication subsystem, including wireless receiver 812 and wireless transmitter 810, and communicated data is provided the microprocessor 802, which is able to further process the received data for output to the display 834, or alternatively, to an auxiliary I/O device 838 or the Data port 828. A user of the electronic device 852 may also compose data items, such as e-mail messages, using the keyboard 836, which is able to include a complete alphanumeric keyboard or a telephone-type keypad, in conjunction with the display 834 and possibly an auxiliary I/O device 838. Such composed items are then able to be transmitted over a communication network through the communication subsystem.

For voice communications, overall operation of the electronic device 852 is substantially similar, except that received signals are generally provided to a speaker 832 and signals for transmission are generally produced by a microphone 830. Alternative voice or audio I/O subsystems, such as a voice message recording subsystem, may also be implemented on the electronic device 852. Although voice or audio signal output is generally accomplished primarily through the speaker 832, the display 834 may also be used to provide an indication of the identity of a calling party, the duration of a voice call, or other voice call related information, for example.

Depending on conditions or statuses of the electronic device 852, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 820 provides for data communication between the electronic device 852 and different systems or devices, which need not necessarily be similar devices. For example, the short-range communications subsystem 820 includes an infrared device and associated circuits and components or a Radio Frequency based communication module such as one supporting Bluetooth® communications, to provide for communication with similarly-enabled systems and devices, including the data file transfer communications described above.

A media reader 860 is able to be connected to an auxiliary I/O device 838 to allow, for example, loading computer readable program code of a computer program product into the electronic device 852 for storage into flash memory 806. One example of a media reader 860 is an optical drive such as a CD/DVD drive, which may be used to store data to and read data from a computer readable medium or storage product such as computer readable storage media 862. Examples of suitable computer readable storage media include optical storage media such as a CD or DVD, magnetic media, or any other suitable data storage device. Media reader 860 is alternatively able to be connected to the electronic device through the Data port 828 or computer readable program code is alternatively able to be provided to the electronic device 852 through the wireless network 850.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A rim for protecting a handheld computing device, the rim comprising:
  a left edge sized and dimensioned to engage a left edge of the handheld computing device;
  a right edge sized and dimensioned to engage a right edge of the handheld computing device;
  a top edge sized and dimensioned to engage a top edge of the handheld computing device;
  a bottom edge sized and dimensioned to engage a bottom edge of the handheld computing device; and
  an electronic processor disposed within at least one of the left, right, top, and bottom edges, the processor communicatively connectable to the handheld computing device when the handheld computing device is engaged by the rim;
  a backplate positionable between the left and right edges of the rim and behind the handheld computing device when the handheld computing device is engaged by the rim, the backplate including an electronic device operative to communicate encoded identification information to the handheld computing device which is decodable by software executing upon the handheld computing device to identify the backplate; and
  the left, right, top, and bottom edges including a resilient material.

2. The rim of claim 1, wherein the rim includes an aperture between the left, right, top, and bottom edges that is sized to reveal all of a display of the handheld computing device when the handheld computing device is engaged within the rim.

3. The rim of claim 1, wherein at least one of the left, right, top, and bottom edges includes a first connector for connecting to the handheld computing device, and wherein at least one of the left, right, top, and bottom edges includes a second connector for electrically connecting to a power supply and communication connector provided for the handheld computing device.

4. The rim of claim 3, wherein the first and second connector are connected to the same one of the left, right, top, and bottom edges.

5. The rim of claim 1, wherein the rim further includes an electronic sensor for detecting a parameter of an environment of the rim.

6. The rim of claim 5, wherein the electronic sensor is connected to the electronic processor.

7. The rim of claim 5, wherein the parameter of the environment is a body temperature of a user of the rim when the rim is engaged with the handheld computing device.

8. The rim of claim 5, wherein the sensor includes a first sensor on the left edge and a second sensor on the right edge, and wherein the parameter of the environment is an electrical property of the skin of a hand of a user of the rim when the rim is engaged with the handheld computing device, the electrical property measured by the first and second sensor at two different places of the hand.

9. The rim of claim 8, wherein the electronic sensor automatically detects the parameter when the user grasps the left and right edges of the rim with a single hand.

10. The rim of claim 9, wherein the electronic sensor automatically detects the parameter when the user grasps the rim.

11. The rim of claim 5, wherein the parameter of the environment is an electrical property of the heart of a user of the rim when the rim is engaged with the handheld computing device.

12. The rim of claim 5, wherein the parameter of the environment is the pulse of a user of the rim when the rim is engaged with the handheld computing device.

13. The rim of claim 5, wherein the rim further includes one or more LEDs for measuring the parameter of the environment.

14. The rim of claim 1, wherein the rim further includes at least one electronic sensor in each of the left and right edges for automatically detecting the body temperature and pulse of a user of the rim when the rim is engaged with the handheld computing device and the user grasps the left and right edges of the engaged rim with a single hand to use the handheld computing device during conversation.

* * * * *